(12) United States Patent
Yamaguchi et al.

(10) Patent No.: US 8,786,229 B2
(45) Date of Patent: Jul. 22, 2014

(54) POWER-CONSUMPTION CALCULATING METHOD OF MOTOR DRIVING DEVICE, AND CONTROL METHOD OF MOTOR DRIVING DEVICE USING THE POWER-CONSUMPTION CALCULATING METHOD

(75) Inventors: Takashi Yamaguchi, Tokyo (JP); Toru Kakebayashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 92 days.

(21) Appl. No.: 13/382,200

(22) PCT Filed: Jul. 8, 2010

(86) PCT No.: PCT/JP2010/061637
§ 371 (c)(1),
(2), (4) Date: Jan. 4, 2012

(87) PCT Pub. No.: WO2011/004871
PCT Pub. Date: Jan. 13, 2011

(65) Prior Publication Data
US 2012/0112671 A1 May 10, 2012

(30) Foreign Application Priority Data
Jul. 8, 2009 (JP) ................................. 2009-162021

(51) Int. Cl.
*H02P 27/00* (2006.01)
(52) U.S. Cl.
USPC ...................................................... 318/400.3
(58) Field of Classification Search
USPC .................. 318/560, 566; 361/1, 5, 23
See application file for complete search history.

(56) References Cited

U.S. PATENT DOCUMENTS

| | | | | | |
|---|---|---|---|---|---|
| 5,268,832 | A | * | 12/1993 | Kandatsu | ......................... 363/95 |
| 6,060,859 | A | * | 5/2000 | Jonokuchi | ..................... 318/801 |
| 2006/0119333 | A1 | * | 6/2006 | Nakamura | ..................... 323/282 |

(Continued)

FOREIGN PATENT DOCUMENTS

| | | |
|---|---|---|
| JP | 2005-117754 A | 4/2005 |
| JP | 2008-109846 A | 5/2008 |
| JP | 2008-295280 A | 12/2008 |
| WO | WO 2009/001686 A1 | 12/2008 |

OTHER PUBLICATIONS

U.S. Appl. No. 13/382,687, filed Jan. 6, 2012, Yamaguchi et al.

(Continued)

*Primary Examiner* — Shawki S Ismail
*Assistant Examiner* — Zoheb Imtiaz
(74) *Attorney, Agent, or Firm* — Foley & Lardner LLP

(57) ABSTRACT

Accurate power consumption is calculated without raising cost, or making the device bigger. Power consumption (P) upon driving a motor is calculated from an input voltage (Vdc), a switching duty factor of a switching device (SW1) of a chopper circuit (ch), which is provided with the switching device (SW1) and a reactor (Ldc), a reactor current (Idc), motor winding reactance ($L_m$), and motor rotation speed (N), in a motor driving device wherein: the input voltage (Vdc) inputted to the chopper circuit (ch) is stepped down by the chopper circuit (ch); DC power outputted by the chopper circuit (ch) is converted to AC power by driving an inverter (INV) with 120-degree conduction, and outputted to a motor (M); and surge voltage to be generated when the inverter (INV) undergoes commutation is clamped to the input voltage (Vdc), by a diode (D1) connected in inverse-parallel to the chopper circuit (ch).

4 Claims, 1 Drawing Sheet

(56) References Cited

U.S. PATENT DOCUMENTS

| | | | |
|---|---|---|---|
| 2009/0145675 A1* | 6/2009 | Ichikawa | 180/65.1 |
| 2009/0167079 A1* | 7/2009 | Nozawa et al. | 307/10.1 |
| 2010/0141188 A1 | 6/2010 | Kakebayashi et al. | |
| 2010/0225271 A1* | 9/2010 | Oyobe et al. | 320/108 |

OTHER PUBLICATIONS

Yosuke Takata et al, "220000r/min, 2kW PM Motor Drive for Turbocharger", Technical Committee 1-9 of the Application Society of the Institute of Electrical Engineers of Japan, Heisei 16 (2004), pp. 155-160.

* cited by examiner

POWER-CONSUMPTION CALCULATING METHOD OF MOTOR DRIVING DEVICE, AND CONTROL METHOD OF MOTOR DRIVING DEVICE USING THE POWER-CONSUMPTION CALCULATING METHOD

TECHNICAL FIELD

This invention relates to a power-consumption calculating method in a driving of a motor driving device (hereinafter, referred to as a pseudo-current source inverter) mounting a chopper circuit, and a 120-degree conduction inverter, and a control method using the power-consumption calculating method.

BACKGROUND ART

FIG. 1 is a circuit configuration diagram showing one example of a general pseudo-current source inverter. As shown in FIG. 1, the pseudo-current source inverter includes a chopper circuit ch, an input voltage Vdc inputted into the chopper circuit ch, a six-step inverter INV which is configured to receive a direct-current power outputted from the chopper circuit ch, and to perform 120-degree conduction, and a diode D1 connected in inverse-parallel to the chopper circuit section ch.

First, a direct current Idc is controlled by switching switching elements SW1 and SW2 of the chopper circuit ch, so as to make the input voltage Vdc and the chopper circuit ch serve as a control current source. The power is supplied to a motor M which is a load by switching operation of a semiconductor switch element of the inverter INV.

In the pseudo-current source inverter, the control current source and the inverter INV are separated, as mentioned above. The current control is performed in the chopper circuit ch of this control current source.

A Patent Document 1 discloses a pseudo-current source inverter which uses an input voltage Vdc and a chopper circuit ch as a control current source, and which drives an inverter INV by 120-degree conduction method.

Moreover, there is known an apparatus which employs a pseudo-current source inverter as an inverter for driving a PM motor in a hybrid system in which the PM motor is embedded in a turbocharger (a non-patent document 1).

PRIOR ART DOCUMENT

Patent Document

Patent document 1: Japanese Patent Application Publication No. 2008-295280 (paragraphs [0027]-[0035], FIG. 1)

Non-patent Document

Non-patent document 1: Yosuke Takata, and four other persons, Heisei 16 (2004) Technical Committee 1-9 of the Applications Society of the Institute of Electrical Engineers of Japan "220000 r/min, 2 kW PM Motor Drive for Turbocharger"

SUMMARY OF THE INVENTION

Problem(s) to be Solved by the Invention

In the above-described pseudo-current source inverter, it is required to know the power consumption at the driving of the motor M. This is because the current power consumption is needed when the present power consumption is feedbacked to a host controller or a recognition device, when the motor M is driven by a power command, and so on.

Conventionally, there is known a method that a current sensor is provided in the input voltage Vdc section, and that the power consumption is calculated from a current value of the input voltage Vdc section. However, the current sensor is expensive, and accordingly this causes the cost increase. Moreover, this needs the installation area, and accordingly the size of the apparatus is increased. Similarly, there is conventionally known a method that a current sensor and a voltage sensor are provided in an inverter input section, and that the power consumption at the driving of the motor M is calculated by measuring an inverter input current Tout and an inverter input voltage Vout. However, in this method, it is necessary to provide new two sensors (a current sensor and a voltage sensor). Accordingly, the cost is increased, and the installation space is needed, so that the size of the apparatus is increased.

Moreover, as the method of calculating the power consumption at the driving of the motor M, there is a method that the power consumption at the driving of the motor M is calculated from a reactor current Idc which is often previously known, and an inverter input voltage Vout measured in the voltage sensor. However, the reactor current Idc includes a return (recirculating) current Id flowing in a diode D1 due to a commutation surge generated at the switching of the semiconductor element of the inverter INV. This return current Id is a reactive power which does not flow in the motor M. Accordingly, for accurately calculating the power consumption of the motor M by using the reactor current Idc, it is necessary to consider the return current Id. Moreover, the inverter input voltage Vout becomes a rectangular voltage waveform due to the switching by the switching elements SW1 and SW2 of the chopper circuit ch. Accordingly, it is difficult to sense the voltage value.

Accordingly, there is a problem that it is not possible to determine the accurate current value and the accurate voltage value even when the current sensor and the voltage sensor.

As described above, it is an object to calculate the accurate power consumption without the cost increase and the size increase.

Means for Solving the Problem(s)

The present invention is a technical idea created to solve the above-described problems, and solves the problems by calculating a power consumption at a driving of a motor by using an input voltage, a switching duty factor of a switching element, and a reactor current which are often previously known.

Specifically, according to one aspect of the present invention, a power consumption calculating method for a motor driving device configured to step down an input voltage inputted to a chopper circuit by the chopper circuit including a series circuit of a first switching element having one end connected to a positive voltage side of the inputted direct-current voltage, and a reactor having one end connected to the other end of the first switching element, and a second switching element disposed between the connection point between the other end of the first switching element and the one end of the reactor, and a negative voltage side of the input voltage, to convert a direct-current power outputted from the chopper circuit to an alternating-current power by driving an inverter by 120-degree conduction, to output to a motor, and to clamp a surge voltage generated at commutation of the inverter to the input voltage by a diode connected in inverse-parallel to the series circuit, the power consumption calculating method comprises: calculating a power consumption of the motor driving device at driving of the motor by a following equation (a) from the input voltage to the chopper circuit, a switching duty factor representing a ratio of an ON state of the first switching element to an ON/OFF cycle of the first switching element, a reactor current flowing in the reactor, a winding reactance of the motor, and a rotational speed of the motor.

$$P = Vdc \times BDuty \cdot \left( Idc - \sqrt{\frac{L_m \cdot Idc \cdot N}{5 \cdot Vdc}} \cdot \frac{Idc}{\sqrt{3}} \right) \quad (a)$$

P; power consumption
Vdc; input voltage
BDuty; switching element switching duty factor
Idc; reactor current
$L_m$; motor winding reactor
N; motor rotational speed.

Moreover, another aspect of the present invention, a power consumption is calculated by multiplying the power consumption of the motor driving device calculated in the equation (a) by an efficiency of the inverter.

Furthermore, another aspect of the present invention, a power control is performed by performing feedback of the power consumption of the motor driving device to an automatic controller.

Moreover, another aspect of the present invention, a control method for a motor driving device configured to step down an input voltage inputted to a chopper circuit by the chopper circuit including a series circuit of a first switching element having one end connected to a positive voltage side of the inputted direct-current voltage, and a reactor having one end connected to the other end of the first switching element, and a second switching element disposed between the connection point between the other end of the first switching element and the one end of the reactor, and a negative voltage side of the input voltage, to convert a direct-current power outputted from the chopper circuit to an alternating-current power by driving an inverter by 120-degree conduction, to output to a motor, and to clamp a surge voltage generated at commutation of the inverter to the input voltage by a diode connected in inverse-parallel to the series circuit, the control method comprises: calculating a current command value by following equations (b) or (c) from the input voltage to the chopper circuit, a switching duty factor representing a ratio of an ON state of the first switching element to an ON/OFF cycle of the first switching element, a reactor current flowing in the reactor, a winding reactance of the motor, a rotational speed of the motor, a power consumption command value of the motor drive device, and an inverter efficiency, and performing a power control by using this current command value.

$$Idc^{ref} = \frac{P^{ref}}{Vdc \cdot BDuty} + \sqrt{\frac{L_m \cdot Idc \cdot N}{5 \cdot Vdc}} \cdot \frac{Idc}{\sqrt{3}} \quad (b)$$

$$Idc^{ref} = \frac{P^{ref}}{\eta \cdot Vdc \cdot BDuty} + \sqrt{\frac{L_m \cdot Idc \cdot N}{5 \cdot Vdc}} \cdot \frac{Idc}{\sqrt{3}} \quad (c)$$

Vdc; input voltage
BDuty; switching element switching duty factor
Idc; reactor current
$L_m$; motor winding reactor
N; motor rotational speed
$Idc^{ref}$; current command value
$P^{ref}$; power consumption command value
η; inverter efficiency Effect(s) of the Invention As evidenced by the above-described description, the power consumption can be calculated by the present invention without providing the current sensor and the voltage sensor in addition to the voltage sensor arranged to sense the input voltage and the current sensor arranged to sense the reactor current. The voltage sensor arranged to sense the input voltage is often previously provided for monitoring the battery voltage, and so on. The current sensor arranged to sense the reactor current is often previously provided for controlling the switching element of the chopper circuit, and so on. In this case, it is unnecessary to add new current sensor and new voltage sensor for calculating the power consumption. Accordingly, it is possible to suppress the cost increase, and to suppress the size increase of the apparatus due to the installation space of the sensors.

MODE(S) FOR CARRYING OUT THE INVENTION

First Embodiment

Figure 1:
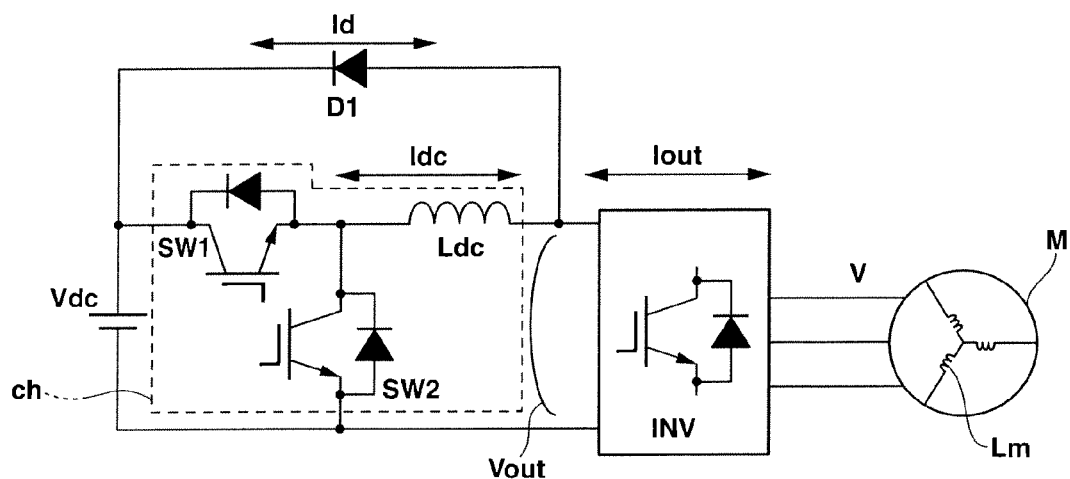
FIG. 1 is a circuit diagram showing one example of a general pseudo-current source inverter.

In FIG. 1, a symbol ch is a chopper circuit which is constituted by switching elements SW1 and SW2, and a reactor Ldc. A symbol Vdc is an input voltage inputted to the chopper circuit ch. A symbol D1 is a diode. A symbol INV is an inverter. A symbol M is a motor.

For example, the chopper circuit ch includes a series circuit including a first switching element connected with a positive terminal side of the input voltage and a reactor; and a second switching element disposed between a connection point between the first switching element and the reactor, and a negative terminal of the input voltage.

The pseudo-current source inverter flows the current from the input voltage Vdc to the reactor Ldc at the driving of the motor M by switching the switching element SW1 of the chopper circuit ch to an ON state, so as to store the energy in the reactor Ldc. When the switching element SW1 is switched to an OFF state, the energy stored in the reactor Ldc is outputted through a diode provided in the switching element SW2 to the inverter INV. The inverter INV receives the direct-current power from the reactor Ldc, coverts this to the three-phase alternating-current power, and outputs to the motor M. In this case, a semiconductor switching element constituting the inverter INV is switched to the ON state or the OFF state in accordance with the magnetic pole position of the motor M, and operated as 120 degree conduction inverter.

Moreover, when the inverter INV performs the commutation at each 120 degree, the surge voltage is generated. This is clamped to the input voltage Vdc through the diode D1 and a free wheel diode of the semiconductor switching element constituting the inverter INV.

On the other hand, in the regenerative state, the motor M generates the induced voltage proportional to the rotational speed. In this case, when the switching element SW2 of the chopper circuit ch is switched to the ON state, the current flows to the reactor Ldc through one of the free wheel diodes provided in the semiconductor switch element of the inverter INV, so as to store the energy in the reactor Ldc. In this case, when the switching element SW2 is switched to the OFF state, the energy stored in the reactor Ldc is boosted (stepped up), and charged to the input voltage Vdc through the free wheel diode provided in the switching element SW1. In this case, the inverter INV is operated as the synchronous rectifier, and the regenerative energy is charged to the input voltage Vdc.

Besides, a control section configured to output a gate signal to the semiconductor switch element of the inverter INV can employ either a sensor control to control by measuring the magnetic pole position of the motor M by the sensor, or a sensorless control to control without measuring the magnetic pole position of the motor M by the sensor. The input voltage Vdc is a direct-current voltage source such as a power supply or a boost chopper.

Hereinafter, a calculating method of the power consumption P at the driving of the motor M is illustrated. In the first embodiment, the power consumption P is calculated by using the input voltage Vdc, the reactor current Idc, and the switching duty factor BDuty of the switching element SW1.

First, variables in the circuit diagram of FIG. 1 are defined as follows. The power consumption P at the driving of the motor M is represented by the following equation (1). However, the loss in the inverter INV is disregarded in the first embodiment.

$$P = V_{OUT} \times I_{OUT} \quad (1)$$
$$= Vdc \times BDuty \cdot (Idc - Id)$$

P; power consumption
Vout; inverter input voltage
Iout; inverter input current
Vdc; input voltage
BDuty; switching duty factor of switching element SW1
Idc; reactor current
Id; return current As shown in the above-described equation (1), the power consumption P of the motor M is calculated by multiplying the inverter input voltage Vout by the inverter input current Iout. The inverter input voltage Vout is a voltage obtained by stepping down the input voltage Vdc by the chopper circuit ch. Accordingly, the inverter input voltage Vout is determined by multiplying the input voltage Vdc by the switching duty factor BDuty of the switching element SW1. The inverter input current Iout is a value obtained by subtracting the return current Id flowing in the diode D1, from the reactor current Idc.

Figure 2:
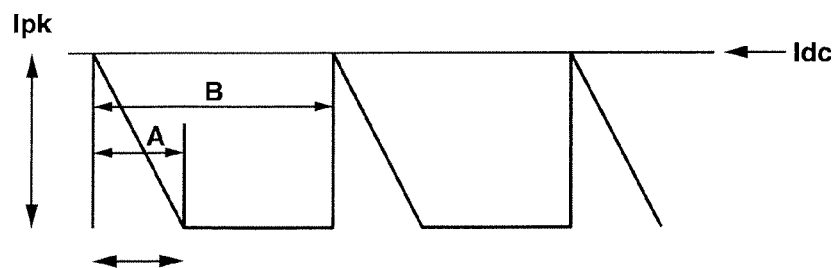
FIG. 2 is a time chart showing one example of a current waveform of a return current Id flowing in a diode D1

The return current Id flows when the semiconductor switch element of the inverter INV is switched (when the commutation surge is generated). It was understood from the actual measured values that a time chart showing a current waveform of this return current Id becomes a saw-tooth wave it becomes the peak current Ipk at the surge voltage as shown in FIG. 2.

Next, a root-mean-square value (effective value) I [rms] of the return current Id is calculated. The root-mean-square value can be calculated by root-mean-square of instantaneous value in one period. In this case, the instantaneous value of the return current Id is represented by I. A conduction time period is represented by A. The one period is represented by B. The root-mean-square value I [rms] of the return current Id can be determined by the following equation (2).

$$I[\text{rms}] = \sqrt{\frac{1}{B}\int_o^A I^2 dt} \quad (2)$$

As shown in the following equation (3), a value obtained by dividing the peak value Ipk of the return current Id by the conduction time period A is represented by k. The instantaneous value I of the return current Id during the conduction time is determined by the following equation (4).

$$k = IPk/A \quad (3)$$

$$l = k(A-t) \quad (4)$$

By substituting k(A−t) in the above-described equation (4) into the instantaneous value I of the equation (2), the equation (2) is reduced to the following equation (5). By substituting Ipk/A in the above-described equation (3) into k in the following equation (5), the equation (5) is reduced to the following equation (6). A/B in the equation (6) corresponds to the duty factor of the return current Id (the switching duty factor of the semiconductor switch element of the inverter INV). Moreover, in case of the inverter INV in the first embodiment, the peak value Ipk of the return current Id is equal to the reactor current Idc. Therefore, the following equation (6) can be reduced into the following equation (7).

$$I[\text{rms}] = \sqrt{\frac{1}{B}\int_o^A (k(A-t))^2 dt} \quad (5)$$
$$= \sqrt{\frac{1}{B}\left[k^2 A^2 t - k^2 A t^2 + \frac{k^2 t^2}{3}\right]_0^A}$$
$$= \sqrt{\frac{1}{B}\frac{k^2 A^2}{3}}$$

$$I[\text{rms}] = \sqrt{\frac{1}{B}\frac{Ipk^2 A}{3}} \quad (6)$$
$$= \sqrt{\frac{A}{B}}\frac{Ipk}{\sqrt{3}}$$

$$I[\text{rms}] = \sqrt{\text{duty}}\frac{Idc}{\sqrt{3}} \quad (7)$$

Next, the duty factor of the return current Id (the switching duty factor of the semiconductor switch element of the inverter INV) is calculated. The duty factor of the return current Id is represented by duty=A/B where the conduction time period is represented by A, and the one period is represented by B. This conduction time period A corresponds to commutation time tc (second) of each phase of the inverter. The one period B is a value obtained by calculating a time period necessary for the one rotation of the motor M by dividing sixty seconds by the rotational speed N (rpm) of the motor M, and then by dividing that value by the commutation frequency (the switch frequency of the inverter INV; six in the first embodiment) in the one rotation of the motor M. Accordingly, the duty factor of the return current Id can be represented by the following equation (8).

$$\text{duty} = \frac{tc}{60/N/6} \quad (8)$$

Next, the commutation time tc in the above-described equation (8) is calculated. A winding reactance of the motor M is represented by $L_m$. A rate of change of the current with respect to time is represented by di. In general, a rate v of change of the terminal voltage of the motor with respect to time can be represented by the following equation (9). This equation (9) can be reduced to the following equation (10).

$$v = L_m \frac{di}{dt} \quad (9)$$

$$dt = L_m \frac{di}{v} \quad (10)$$

When dt in the above-described equation (10) is considered to be the commutation time tc at the switching of the inverter INV in the first embodiment, the rate di of change of the current with respect to the time corresponds to the reactor current Idc, the rate v of change of the terminal voltage of the motor M with respect to the time corresponds to the input voltage Vdc, and the reactance $L_m$ corresponds to two phase amount of the winding reactance $L_m$. Accordingly, the following equation (11) is established.

$$tc = \frac{2 \cdot L_m \cdot Idc}{Vdc} \quad (11)$$

By substituting the above-described equation (11) into the commutation time tc in the above-described equation (8), the duty factor of the return current Id (the semiconductor switch element of the inverter INV) becomes the following equation (12). Then, by substituting the duty factor of the return current Id (the semiconductor switch element of the inverter INV) calculated by the following equation (12) into the above-described equation (7), the root-mean-square value I [rms] of the return current Id can be represented by the following equation (13).

$$\text{duty} = \frac{\frac{2 \cdot L_m \cdot Idc}{Vdc}}{60/N/6} = \frac{L_m \cdot Idc \cdot N}{5 \cdot Vdc} \quad (12)$$

$$I[\text{rms}] = \sqrt{\frac{L_m \cdot Idc \cdot N}{5 \cdot Vdc}} \cdot \frac{Idc}{\sqrt{3}} \quad (13)$$

By substituting the root-mean-square value I [rms] of the return current Id in the above-described equation (13) into the return current Id in the above-described equation (1), the following equation (14) is obtained. By calculating the following equation (14), the power consumption P at the driving of the motor M can be calculated.

$$P = Vdc \times BDuty \cdot \left( Idc - \sqrt{\frac{L_m \cdot Idc \cdot N}{5 \cdot Vdc}} \cdot \frac{Idc}{\sqrt{3}} \right) \quad (14)$$

By using the above-described equation (14), it becomes possible to calculate the power consumption P without providing other current sensors and other voltage sensors in addition to the voltage sensor to sense the input voltage Vdc and the current sensor to sense the reactor current Idc. The voltage sensor to sense the input voltage Vdc is often previously provided for monitoring the battery voltage and so on. The current sensor to sense the reactor current Idc is often previously provided for the control of the switching element of the chopper circuit ch and so on. In these case, it is unnecessary to add new current sensor and new voltage sensor for calculating the power consumption P. Accordingly, it is possible to suppress the cost increase, and to suppress the size increase due to the installation space of the sensors.

Moreover, in the first embodiment, the value obtained by subtracting the root-mean-square value of the return current Id from the reactor current Idc is used as the inverter current Tout necessary when the power consumption P is calculated. Accordingly, in comparison with the case in which the reactor current Idc is used as the inverter input current Tout, it is possible to calculate the accurate power consumption P. Moreover, the inverter input voltage Vout necessary when the power consumption P is calculated becomes the rectangular voltage waveform due to the switching by the chopper circuit ch, and accordingly it is difficult to sense the accurate voltage value. However, in the first embodiment, the value obtained by multiplying the input voltage Vdc by the switching duty factor BDuty of the switching element SW1 is set to the inverter input voltage Vout. Accordingly, it is possible to calculate the accurate power consumption P.

Moreover, by calculating the power consumption P, it is possible to perform the feedback of the present power consumption P to the host controller, the recognition device, and so on, and to drive the motor M by the power command.

For example, it is possible to perform the feedback of the power consumption P calculated in the first embodiment to an automatic controller (for example, an automatic controller of APR or ACR constituted by a cascade connection), and to perform the power control. Moreover, by using the following equation (15) obtained by the inverse operation of the above-described equation (14), it is possible to perform the simplified power control. In this case, by setting a superior power command $P^{ref}$, it is possible to obtain a current command value $Idc^{ref}$ in which the power consumption is limited by the superior power command $P^{ref}$. By performing the current control by using this current command value $Idc^{ref}$, it is possible to attain the simplified power control.

$$Idc^{ref} = \frac{P^{ref}}{Vdc \cdot BDuty} + \sqrt{\frac{L_m \cdot Idc \cdot N}{5 \cdot Vdc}} \cdot \frac{Idc}{\sqrt{3}} \quad (15)$$

Second Embodiment

Next, another embodiment of a power consumption calculating method of the pseudo-current source inverter according to the present invention is illustrated. A circuit configuration of the pseudo-current source inverter in the second embodiment is identical to that of the first embodiment.

The power consumption P calculated in the above-described first embodiment is a value calculated by using the parameters (the input voltage Vdc, the buck (step-down) reactor current Idc, and the switching duty factor Bduty of the switching element SW1) before and after the chopper circuit ch. This value is a value calculated without considering the loss in the inverter INV. Therefore, the power consumption P calculated in the first embodiment is the average power before and after the chopper circuit ch with all the pseudo-current source inverter considered.

Therefore, in the second embodiment, an inverter efficiency η is previously calculated. By multiplying this inverter efficiency η and the power consumption P calculated in the same method as the first embodiment, as shown in the following equation (16), the power consumption P' in consideration with the inverter loss is calculated.

$$P' = \eta P \qquad (16)$$

As the method of calculating the inverter efficiency η in the above-described equation (16), there is a method of determining the internal loss of the inverter INV by the calculation and so on, a method of calculating an error amount by the actual measurement, and so on.

The power consumption P' calculated in the second embodiment is the power consumption determined in consideration with the inverter loss. In comparison with the power consumption P calculated in the first embodiment, this becomes more accurate power consumption relative to the power consumption P calculated in the first embodiment. Moreover, by calculating the power consumption P' at the driving of the motor M as in the second embodiment, it is also possible to attain the same effect as the first embodiment.

Moreover, by calculating the power consumption P', like the first embodiment, it is possible to perform the feedback of the present power consumption P to the host controller, the recognition devices, and so on, and to drive the motor M by the power command. Besides, when in the second embodiment, the simplified power control is performed by performing current control by calculating the current command value $Idc^{ref}$, the current command value $Idc^{ref}$ is calculated by the following equation (17).

$$Idc^{ref} = \frac{P^{ref}}{\eta \cdot Vdc \cdot BDuty} + \sqrt{\frac{L_m \cdot Idc \cdot N}{5 \cdot Vdc}} \cdot \frac{Idc}{\sqrt{3}} \qquad (17)$$

Although the present invention has been described above in detail only by reference to the described embodiments, various modifications and variations of the embodiments will occur to those skilled in the art within the technical concept of the present invention. Naturally, such modifications and variations belong to the scope of the claims.

EXPLANATION OF SYMBOLS

SW1, SW2 ... switching element
Ldc ... reactor
ch ... chopper circuit
Vdc ... input voltage
INV ... inverter
M ... motor
D1 ... diode

The invention claimed is:

1. A power consumption calculating method for a motor driving device configured to step down an input voltage inputted to a chopper circuit by the chopper circuit including a series circuit of a first switching element having one end connected to a positive voltage side of the inputted direct-current voltage, and a reactor having one end connected to the other end of the first switching element, and a second switching element disposed between the connection point between the other end of the first switching element and the one end of the reactor, and a negative voltage side of the input voltage, to convert a direct-current power outputted from the chopper circuit to an alternating-current power by driving an inverter by 120-degree conduction, to output to a motor, and to clamp a surge voltage generated at commutation of the inverter to the input voltage by a diode connected in inverse-parallel to the series circuit, the power consumption calculating method comprising:

calculating a power consumption of the motor driving device at driving of the motor by a following equation (a) from the input voltage to the chopper circuit, a switching duty factor representing a ratio of an ON state of the first switching element to an ON/OFF cycle of the first switching element, a reactor current flowing in the reactor, a winding reactance of the motor, and a rotational speed of the motor, $$P = Vdc \times BDuty \cdot \left( Idc - \sqrt{\frac{L_m \cdot Idc \cdot N}{5 \cdot Vdc}} \cdot \frac{Idc}{\sqrt{3}} \right) \qquad (a)$$

P; power consumption
Vdc; input voltage
BDuty; switching element switching duty factor
Idc; reactor current
$L_m$; motor winding reactor
N; motor rotational speed.

2. The power consumption calculating method for the motor driving device as claimed in claim 1, wherein a power consumption is calculated by multiplying the power consumption of the motor driving device calculated in the equation (a) by an efficiency of the inverter.

3. A control method for the motor driving device by using the power consumption calculating method as claimed in claim 1, wherein a power control is performed by performing feedback of the power consumption of the motor driving device to an automatic controller.

4. A control method for a motor driving device configured to step down an input voltage inputted to a chopper circuit by the chopper circuit including a series circuit of a first switching element having one end connected to a positive voltage side of the inputted direct-current voltage, and a reactor having one end connected to the other end of the first switching element, and a second switching element disposed between the connection point between the other end of the first switching element and the one end of the reactor, and a negative voltage side of the input voltage, to convert a direct-current power outputted from the chopper circuit to an alternating-current power by driving an inverter by 120-degree conduction, to output to a motor, and to clamp a surge voltage generated at commutation of the inverter to the input voltage by a diode connected in inverse-parallel to the series circuit, the control method comprising:

calculating a current command value by following equations (b) or (c) from the input voltage to the chopper circuit, a switching duty factor representing a ratio of an ON state of the first switching element to an ON/OFF cycle of the first switching element, a reactor current flowing in the reactor, a winding reactance of the motor, a rotational speed of the motor, a power consumption command value of the motor drive device, and an inverter efficiency, and performing a power control by using this current command value, $$Idc^{ref} = \frac{P^{ref}}{Vdc \cdot BDuty} + \sqrt{\frac{L_m \cdot Idc \cdot N}{5 \cdot Vdc}} \cdot \frac{Idc}{\sqrt{3}} \qquad (b)$$

$$Idc^{ref} = \frac{P^{ref}}{\eta \cdot Vdc \cdot BDuty} + \sqrt{\frac{L_m \cdot Idc \cdot N}{5 \cdot Vdc}} \cdot \frac{Idc}{\sqrt{3}} \qquad (c)$$

Vdc; input voltage
BDuty; switching element switching duty factor
Idc; reactor current
$L_m$; motor winding reactor
N; motor rotational speed
$Idc^{ref}$; current command value
$P^{ref}$; power consumption command value
η; inverter efficiency.

\* \* \* \* \*